United States Patent
Lee et al.

(10) Patent No.: US 9,079,472 B2
(45) Date of Patent: Jul. 14, 2015

(54) SUSPENSION SPRING FOR SHOCK ABSORBER USING CARBON FIBER REINFORCED PLASTIC

(71) Applicant: MANDO CORPORATION, Pyeongtaek-si, Gyeonggi-do (KR)

(72) Inventors: Jung Hwan Lee, Suwon-si (KR); Ki Ju Sohn, Gunpo-si (KR); Woo Il Lee, Seoul (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 214 days.

(21) Appl. No.: 13/891,535

(22) Filed: May 10, 2013

(65) Prior Publication Data
US 2013/0313767 A1 Nov. 28, 2013

(30) Foreign Application Priority Data
May 10, 2012 (KR) .......................... 10-2012-0049769

(51) Int. Cl.
| | |
|---|---|
| B60G 11/22 | (2006.01) |
| B60G 15/06 | (2006.01) |
| B60G 11/00 | (2006.01) |
| F16F 1/32 | (2006.01) |
| F16F 1/366 | (2006.01) |
| F16F 3/02 | (2006.01) |

(52) U.S. Cl.
CPC ............... *B60G 11/22* (2013.01); *B60G 11/00* (2013.01); *B60G 15/066* (2013.01); *F16F 1/32* (2013.01); *F16F 1/366* (2013.01); *F16F 3/02* (2013.01); *B60G 2202/14* (2013.01); *B60G 2204/12* (2013.01)

(58) Field of Classification Search
CPC ...... B60G 11/22; B60G 15/066; B60G 11/00; B60G 2202/143
USPC .................................................. 267/219, 292
See application file for complete search history.

(56) References Cited

U.S. PATENT DOCUMENTS

| | | | | |
|---|---|---|---|---|
| 4,235,426 A | * | 11/1980 | Sullivan et al. | ............... 267/220 |
| 4,799,654 A | | 1/1989 | Eickmann | |
| 5,339,930 A | * | 8/1994 | Sich et al. | ..................... 188/210 |

(Continued)

FOREIGN PATENT DOCUMENTS

| | | |
|---|---|---|
| KR | 10-1996-0037164 A | 11/1996 |
| KR | 20-1998-0031761 A | 8/1998 |

(Continued)

OTHER PUBLICATIONS

Chinese Notificcation of First Office Action issued in counterpart Chinese Patent Application No. 201310163870.6 on Nov. 26, 2014; 8 pages in Chinese language.

*Primary Examiner* — Vishal Sahni
(74) *Attorney, Agent, or Firm* — McDermott Will & Emery LLP

(57) ABSTRACT

Provided is a suspension spring for a shock absorber using carbon fiber reinforced plastic. From a structure including a spring unit in which a plurality of bowl-shaped unit bodies are stacked between a first sheet and a second sheet along a length direction of a piston rod, the suspension spring for the shock absorber can achieve weight reduction and durability improvement while exhibiting the same performance as that of steel coil spring by using the carbon fiber reinforced plastic.

5 Claims, 3 Drawing Sheets

(56) References Cited

U.S. PATENT DOCUMENTS

| | | | | |
|---|---|---|---|---|
| 5,580,075 | A * | 12/1996 | Turner et al. | 280/276 |
| 5,678,809 | A * | 10/1997 | Nakagawa et al. | 267/148 |
| 5,957,441 | A * | 9/1999 | Tews | 267/153 |
| 6,199,708 | B1 * | 3/2001 | Monaco | 213/43 |
| 6,250,617 | B1 * | 6/2001 | Tews | 267/153 |
| 6,394,435 | B1 * | 5/2002 | Monson | 267/141.1 |
| 2012/0073884 | A1 | 3/2012 | Guthrie | |

FOREIGN PATENT DOCUMENTS

| | | |
|---|---|---|
| KR | 10-1998-0052274 A | 9/1998 |
| KR | 10-2007-0078631 A | 8/2007 |

* cited by examiner

SUSPENSION SPRING FOR SHOCK ABSORBER USING CARBON FIBER REINFORCED PLASTIC

CROSS-REFERENCE(S) TO RELATED APPLICATION

This application claims priority of Korean Patent Application No. 10-2012-49769, filed on May 10, in the Korean Intellectual Property Office, the contents of which are incorporated herein by reference in its entirety.

BACKGROUND OF THE INVENTION

1. Field of the Invention

The present invention relates to a suspension spring for a shock absorber using carbon fiber reinforced plastic, and more particularly, to a suspension spring for a shock absorber using carbon fiber reinforced plastic, which can achieve weight reduction and durability improvement while exhibiting the same performance as that of steel coil spring by using the carbon fiber reinforced plastic.

2. Description of the Related Art

Recently, a variety of research and development has been conducted in an effort to improve the fuel efficiency of a vehicle. As an example, many efforts have been made to improve the fuel efficiency through weight reduction by manufacturing a vehicle body using various alternative materials of metallic materials, such as a ceramic or a carbon fiber.

An attempt has been actively made to apply composite materials for weight reduction, such as carbon fiber reinforced plastic (hereinafter, referred to as CFRP), to a vehicle interior material, a vehicle body, a leaf spring, a bumper, and the like.

Many researchers have made attempts to manufacture a coil type spring using CFRP. However, since CFRP is vulnerable to compressive stress or shear stress, it is difficult to manufacture the coil type spring, which transfers a force through shear stress, by using only CFRP.

Therefore, there is an urgent need for developing parts and materials that can achieve weight reduction, have excellent durability, and replace coil springs.

CITATION LIST

Patent Literature

Korean Patent Application No. 10-1995-0010636
Korean Patent Application No. 10-1996-0071246
Korean Utility Model Application No. 20-1996-0044924

SUMMARY OF THE INVENTION

The present invention has been made in an effort to resolve the above-described problems, and provides a suspension spring for a shock absorber using CFRP, which can achieve weight reduction and durability improvement while exhibiting the same performance as that of the steel coil spring by using the CFRP.

According to an embodiment of the present invention, a suspension spring for a shock absorber using carbon fiber reinforced plastic includes: a piston rod reciprocatingly connected to a cylinder filled with working fluid; a first sheet mounted on an end portion of the cylinder; a second sheet mounted on an end portion of the piston rod; and a spring unit provided by stacking a plurality of unit bodies made of a prepreg of a multi-stacked carbon fiber synthesis resin, the unit bodies having openings, through centers of which the piston rod passes and which gradually widen toward one side, wherein the respective unit bodies are stacked along a length direction of the piston rod such that the openings face one another.

The openings of the unit bodies may be seated on the first sheet.

The unit bodies may be seated on the first sheet such that the openings face the second sheet.

The openings of the unit bodies may be arranged on the second sheet to contact one another.

The unit bodies may be arranged on the second sheet such that the openings face the first sheet.

According to another embodiment of the present invention, a suspension spring for a shock absorber using carbon fiber reinforced plastic includes: a spring unit in which a plurality of unit bodies are stacked along a vertical length direction of a piston rod, each of the unit bodies including: a support piece forming an inner peripheral surface corresponding to an outer peripheral surface of the piston rod; and an elastic piece extending from one end edge of the support piece and forming a gradually widening opening, wherein the respective unit bodies are stacked along a length direction of the piston rod such that the openings face one another.

In the unit body, the support piece may be connected from one end edge of the elastic piece and arranged in an outside of the elastic piece.

An inner diameter of the support piece may be greater than an outer diameter of the piston rod.

An inner diameter of the support piece may be 40 to 60% of a diameter of the opening.

The support piece and the elastic piece may have a thickness of 2 to 3 mm.

The spring unit may further include a first flange extending from an edge of the opening.

The spring unit may further include a ring-shaped latch protrusion extending from an edge of the first flange.

The spring unit may include: an insertion hole further including a first flange extending from an edge of the opening; and an accommodation hole provided separately from the insertion hole and further including a first flange extending from an edge of the opening of the elastic piece, and a ring-shaped latch protrusion extending from an edge of the first flange, the first flange of the insertion hole is seated on the first flange of the accommodation hole, and the insertion hole and the accommodation hole are repetitively arranged along the length direction of the piston rod.

A distance between the insertion hole and the accommodation hole connected together along the length direction of the piston rod may be 10 to 30% of an inner diameter of the support piece.

DETAILED DESCRIPTION OF EXEMPLARY EMBODIMENTS

Figure 1:
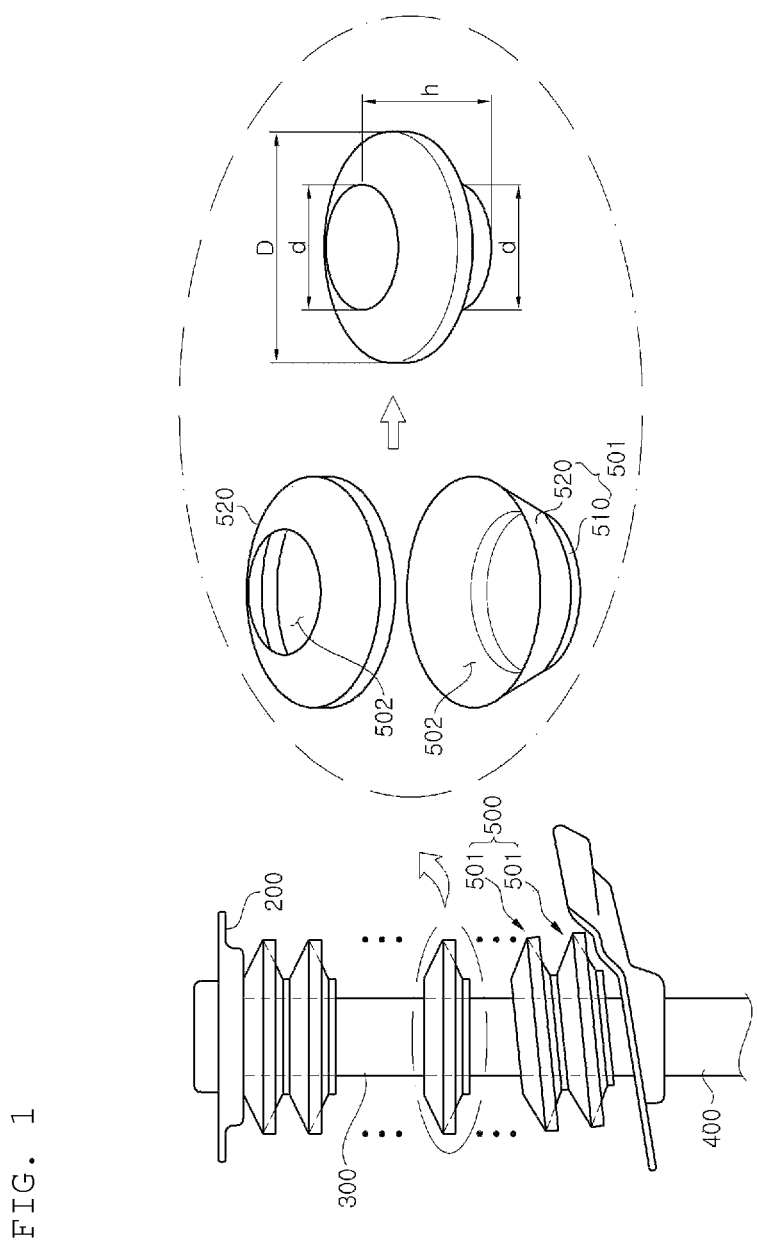
FIG. 1 is a conceptual diagram showing a structure of a suspension spring for a shock absorber using CFRP according to an embodiment of the present invention.

Exemplary embodiments of the present invention will be described below in detail with reference to the accompanying drawings. Throughout the disclosure, like reference numerals refer to like parts throughout the drawings and embodiments of the present invention.

FIG. 1 is a conceptual diagram showing a structure of a suspension spring for a shock absorber using CFRP according to an embodiment of the present invention.

It can be seen from FIG. 1 that the suspension spring for the shock absorber is configured to include a spring unit 500 in which a plurality of bowl-shaped unit bodies 501 are stacked between a first sheet 100 and a second sheet 200 along a length direction of a piston rod 300.

The piston rod 300 is reciprocatingly connected to a cylinder 400 filled with working fluid. The first sheet 100 is mounted on an end portion of the cylinder 400, and the second sheet 200 is mounted on an end portion of the piston rod 300.

The spring unit 500 is provided by stacking a plurality of unit bodies 501 made of a prepreg of a multi-stacked carbon fiber synthesis resin. The unit bodies 501 have the openings 502, through the centers of which the piston rod 300 passes and which gradually widen toward one side.

The unit bodies 501 are stacked along the length direction of the piston rod 300 such that the openings 502 mutually face one another, and interwork with the reciprocating motion of the piston rod 300. Therefore, the unit bodies 501 exhibit shock absorption performance by permitting elastic deformation with respect to a force applied between the first sheet 100 and the second sheet 200 along the length direction of the piston rod 300.

In addition to the above-described embodiment, the following various embodiments can also be applied to the present invention.

Figure 2:
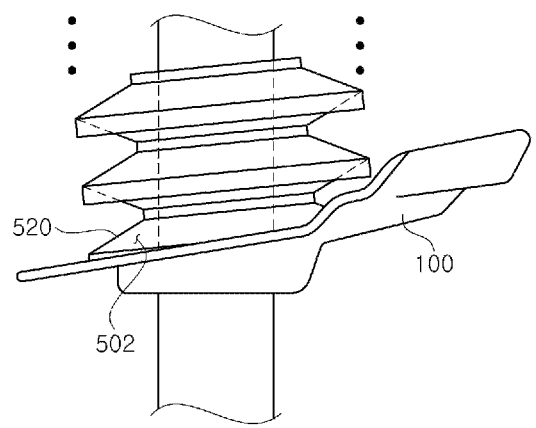
FIGS. 2 and 3 are conceptual diagrams showing arrangement structures of suspension springs for a shock absorber using CFRP according to various embodiments of the present invention.
Figure 3:
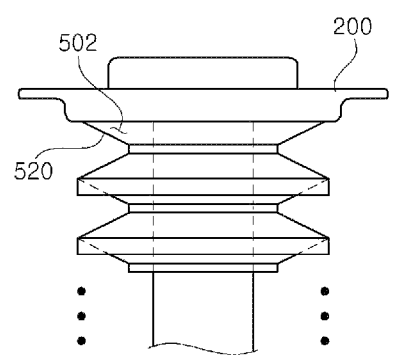
Figure 4:
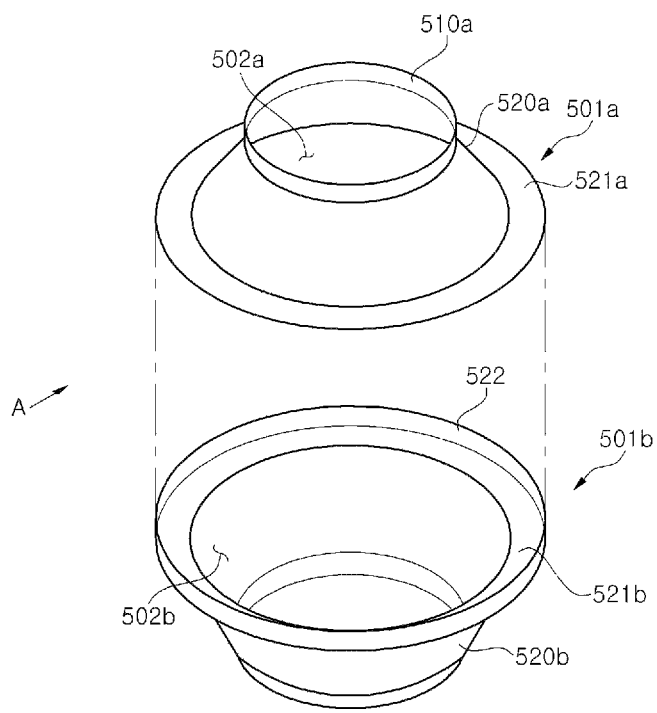
FIGS. 4 and 5 are conceptual diagrams showing structures of unit body in a suspension spring for a shock absorber using CFRP according to another embodiment of the present invention.
Figure 5:
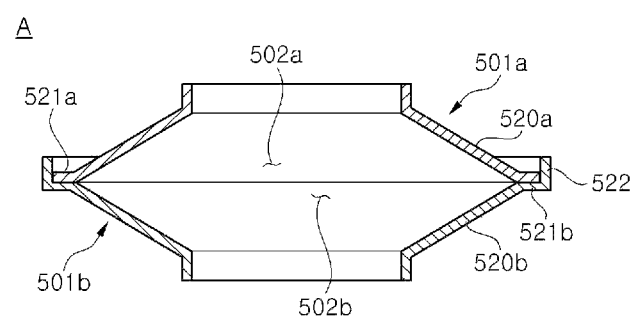

FIGS. 2 and 3 are conceptual diagrams showing arrangement structures of suspension springs for a shock absorber using CFRP according to various embodiments of the present invention.

The unit bodies constituting the spring unit 500 can exhibit shock absorption performance by applying various arrangement structures as shown in FIGS. 1, 2 and 3.

For example, the unit bodies 501 may be seated on the first sheet 100 such that the opening 502 are directed toward the second sheet 200 as shown in FIG. 1, or the openings 502 of the unit bodies 501 may be seated as shown in FIG. 2.

The unit bodies 501 may be seated on the second sheet 200 such that the openings 502 face the first sheet 100 as shown in FIG. 1, or the openings 502 of the unit bodies 501 may be arranged on the second sheet 200 to contact one another as shown in FIG. 3.

The structure of the unit body 501 constituting the spring unit 500 will be described in more detail.

The unit body 501 includes a support piece 510 forming an inner peripheral surface corresponding to an outer peripheral surface of the piston rod 300.

An elastic piece 520 is a bowl-shaped member that forms the gradually widening opening 502 extending from one end edge of the support piece 510, and the support piece 510 may be omitted according to circumstances.

The plurality of unit bodies 501 are stacked along the vertical length direction of the piston rod 300. In order to exhibit appropriate shock absorption performance, it is preferable that the unit bodies 501 are stacked along the length direction of the piston rod 300 such that the openings 502 face one another.

The support piece 510 is connected from one end edge of the elastic piece 520 and is disposed in the outside of the elastic piece 520.

In this case, it is preferable that an inner diameter d of the support piece 510 is greater than an outer diameter of the piston rod 300 so that the unit bodies 501 can be smoothly seated even on the first sheet 100 mounted to be inclined with respect to the cylinder 400 as shown in FIGS. 1 and 2.

It is preferable that the inner diameter d of the support piece 510 is designed to be formed within a range of 40 to 60% of a diameter D of the opening 502.

The unit body 501 is provided by stacking a plurality of prepregs of carbon fiber synthesis resin such that the support piece 510 and the elastic piece 520 have a thickness of 2 to 3 mm.

The inner diameter d of the support piece 510, the diameter D of the opening 502, the thickness range of the support piece 510 and the elastic piece 520 are optimal ranges that can cause the unit body 501 to maintain durability while permitting smooth elastic deformation.

In this case, if less than the lower limits of the above-described ranges, for example, if the inner diameter d of the support piece 510 is less than 40% of the diameter D of the opening 502, elastic deformation is disturbed and shock absorption performance is degraded. That is, it is difficult for the structure to cause elastic deformation.

If greater than the upper limits of the above-described ranges, for example, if the inner diameter d of the support piece 510 exceeds 60% of the diameter D of the opening 502, smooth shock absorption performance is not exhibited. That is, the structure is easy to cause elastic deformation, and it is difficult to effectively disperse vehicle body shock.

Meanwhile, it is apparent that the present invention can also be applied to an embodiment of a structure further including a first flange 521 and a latch protrusion 522.

That is, the spring unit 500 may apply to an embodiment of a structure that further includes the first flange 521 extending from the edge of the opening 502 of the elastic piece 520 and further includes the ring-shaped latch protrusion 522 extending from the edge of the first flange 521.

In other words, the first flange 521 and the latch protrusion 522 may be considered as a technical means for preventing variables such as location deviation due to mutual distortional warping stress in the process of repeating the restoration after the elastic deformation of each unit body 501 with respect to the compressive force between the first sheet 100 and the second sheet 200 (see FIG. 1) according to the reciprocation of the piston rod 300.

More specifically, the spring unit 500 may apply to a structure in which an insertion hole 501a is seated in an accommodation hole 501b.

The insertion hole 501a is configured such that the first flange 521a extends from the edge of the opening 502a of the elastic piece 520a.

Separate from the insertion hole 501a, the accommodation hole 501b is a structure that further includes a first flange 521b extending from the edge of the opening 502b of the elastic piece 520b, and a ring-shaped latch protrusion 522 extending from the edge of the first flange 521b.

Therefore, the first flange 521a of the insertion hole 501a is seated on the first flange 521b of the accommodation hole 501b, and the insertion hole 501a and the accommodation hole 501b configured as above are repetitively arranged along the length direction of the piston rod 300.

In this case, it is preferable that a distance h (see FIG. 1) between the insertion hole 501a and the accommodation hole 501b connected together along the length direction of the piston rod 300 is 10 to 30% of the inner diameter d of the support piece 510.

The range of the distance h may be considered in the same context as the inner diameter d of the support piece 510, the diameter D of the opening 502, and the thickness ranges of the support piece 510 and the elastic piece 520.

That is, if the distance h is less than 10% of the inner diameter d of the support piece 510, an elastic repulsive force may be reduced to disturb the exhibition of desired shock absorption performance. On the other hand, if the distance h is greater than 30% of the inner diameter d of the support piece 510, a resistance against the elastic deformation becomes excessive, making it difficult to cause the elastic deformation.

As a result, the exhibition of desired shock absorption performance will be disturbed. As described above, it can be seen that the basic technical spirit of the present invention is to provide the suspension spring for the shock absorber using CFRP, which can achieve weight reduction and durability improvement while exhibiting the same performance as steel coil spring by using CFRP.

According to the present invention configured as above, the spring unit in which unit bodies made of the prepreg of the carbon fiber synthesis resin are vertically stacked between the first sheet and the second sheet to form the openings makes it possible to provide the same shock absorption force as that of the existing steel coil spring and achieve more weight reduction than the existing steel coil.

Therefore, the weight of the vehicle body can be reduced, and thus, the fuel efficiency of the vehicle can also be improved.

While the embodiments of the present invention have been described with reference to the specific embodiments, it will be apparent to those skilled in the art that various changes and modifications may be made without departing from the spirit and scope of the invention as defined in the following claims.

Reference Signs List

| | |
|---|---|
| 100: first sheet | 200: second sheet |
| 300: piston rod | 400: cylinder |
| 500: spring unit | |

What is claimed is:

1. A suspension spring for a shock absorber using carbon fiber reinforced plastic, the suspension spring comprising:
    a piston rod reciprocatingly connected to a cylinder filled with working fluid;
    a first sheet mounted on an end portion of the cylinder;
    a second sheet mounted on an end portion of the piston rod; and
    a spring unit provided by stacking a plurality of unit bodies made of a prepreg of a multi-stacked carbon fiber synthesis resin, the unit bodies having openings, through centers of which the piston rod passes and which gradually widen toward one side,
    wherein the respective unit bodies are stacked along a length direction of the piston rod such that the openings face one another, and
    the stack of the unit bodies includes one of the following structures:
    the opening of the unit body which is disposed at the most bottom end in the plurality of the unit bodies is faced to the fist sheet and the opening of the unit body which is disposed at the most upper end in the plurality of the unit bodies is faced to the second sheet,
    the opening of the unit body which is disposed at the most bottom end in the plurality of the unit bodies is faced to the second sheet and the opening of the unit body which is disposed at the most upper end in the plurality of the unit bodies is faced to the second sheet,
    the opening of the unit body which is disposed at the most bottom end in the plurality of the unit bodies is faced to the first sheet and the opening of the unit body which is disposed at the most upper end in the plurality of the unit bodies is faced to the first sheet, or
    the opening of the unit body which is disposed at the most bottom end in the plurality of the unit bodies is faced to the second sheet and the opening of the unit body which is disposed at the most upper end in the plurality of the unit bodies is faced to the first sheet.

2. A suspension spring for a shock absorber using carbon fiber reinforced plastic, the suspension spring comprising:
    a spring unit in which a plurality of unit bodies are stacked along a vertical length direction of a piston rod, each of the unit bodies comprising:
        a support piece forming an inner peripheral surface corresponding to an outer peripheral surface of the piston rod; and
        an elastic piece extending from one end edge of the support piece and forming a gradually widening opening,
        wherein in the unit body, the support piece is connected from one end edge of the elastic piece and is arranged in an outside of the elastic piece, and
        wherein an inner diameter of the support piece is greater than an outer diameter of the piston rod,
    wherein the spring unit comprises:
        an insertion hole including a first insertion flange extending from an edge of the opening; and
        an accommodation hole provided separately from the insertion hole, the accommodation hole including a first accommodation flange extending from an edge of the opening of the elastic piece and a ring-shaped latch protrusion extending form an edge of the first accommodation flange,
        wherein the first insertion flange is seated on the first accommodation flange,
    the insertion hole and the accommodation hole are repetitively arranged along the length direction of the piston rod, and
    the respective unit bodies are stacked along the length direction of the piston rod such that the openings face one another.

3. The suspension spring according to claim 2, wherein an inner diameter of the support piece is 40 to 60% of a diameter of the opening.

4. The suspension spring according to claim 2, wherein the support piece and the elastic piece have a thickness of 2 to 3 mm.

5. The suspension spring according to claim 2, wherein a distance between the insertion hole and the accommodation hole connected together along the length direction of the piston rod is 10 to 30% of an inner diameter of the support piece.

* * * * *